US005896930A

United States Patent [19]
Arai

[11] Patent Number: 5,896,930
[45] Date of Patent: Apr. 27, 1999

[54] CONTROL SYSTEM IN HYDRAULIC CONSTRUCTION MACHINE

[75] Inventor: Seigo Arai, Hiroshima, Japan

[73] Assignee: Kabushiki Kaisha Kobe Seiko Sho, Kobe, Japan

[21] Appl. No.: 09/013,068

[22] Filed: Jan. 26, 1998

[30] Foreign Application Priority Data

Jan. 27, 1997 [JP] Japan .................................... 9-012900

[51] Int. Cl.[6] ............................... F16D 31/02; E02F 9/20
[52] U.S. Cl. .................................................. 172/2; 60/452
[58] Field of Search .................................... 172/1, 2, 3, 4, 172/4.5, 7, 9; 37/348; 364/424.07; 60/452, 426, 427, 444, 486; 91/5.8, 461

[56] References Cited

U.S. PATENT DOCUMENTS 4,967,557 11/1990 Izumi et al. .............................. 60/423
5,170,625 12/1992 Watanabe et al. ......................... 60/452

FOREIGN PATENT DOCUMENTS 4-30037 2/1992 Japan .

*Primary Examiner*—Thomas B. Will
*Assistant Examiner*—Robert Pezzuto
*Attorney, Agent, or Firm*—Oblon, Spivak, McClelland, Maier & Neustadt, P.C.

[57] ABSTRACT

A hydraulic pump is driven by a first prime mover. An actuator, which is controlled by a control valve, is operated by a pressure oil fed from the hydraulic pump. A second prime mover, which is an electric motor, is provided separately from the first prime mover. A pilot pump is driven by the motor. Hydraulic oil is conducted from the pilot pump to a pilot port of the control valve through a pilot oil pipe. A remote control valve is provided in the pilot oil pipe, and change-over operation of the control valve is controlled by the remote control valve. In an on-load state, a command value for controlling the motor is set at a target current value corresponding to a normal pressure, while in an off-load state the command value is set at a target current value which is lower. By so doing, there does not occur any unnecessary power loss even in an off-load state.

3 Claims, 3 Drawing Sheets

CURRENT VALUE A<CURRENT VALUE B<CURRENT VALUE C

CONTROL SYSTEM IN HYDRAULIC CONSTRUCTION MACHINE

BACKGROUND OF THE INVENTION

1. Filed of the Invention

The present invention relates to a control system in a hydraulic construction machine such as a hydraulic excavator or a bulldozer.

2. Description of the Related Art

Generally, a hydraulic excavator or a bulldozer is provided with a hydraulic pump which is driven by a prime mover. Hydraulic oil discharged by operation of the hydraulic pump is fed to actuators (for example a hydraulic cylinder) through control valves, which actuators actuate a working attachment such as an arm.

FIG. 3 shows an example of a conventional control system used in a hydraulic construction machine. A hydraulic pump 2 and a pilot pump 3 are connected to a shaft 10 of a prime mover 1. A control valve 5 is disposed between the hydraulic pump 2 and an actuator 4. Pilot oil pipes 53 and 54 are connected to a discharge oil pipe 31 of the pilot pump 3 through remote control valves 51 and 52. To the discharge oil pipe 31 is also connected a tank 6 through a relief valve 61. In accordance with operation of the remote control valves 51 and 52, hydraulic oil from the pilot pump 3 is fed to a pilot port of the control valve 5 to change over the state of the control valve 5.

In the above conventional control system, when the prime mover 1 is rotating at high speed and the actuator 4 is not operated (off-load), the pilot pump 3 is driven like an operating state (on-load) of the actuator, so that the hydraulic oil from the pilot pump 3 is not fed to the pilot oil pumps 53 and 54 but is returned to the tank 6 wastefully through the relief valve 61. Consequently, there occurs a large power loss. Moreover, upon turning OFF of the prime mover 1, the pilot pump 3 also stops operation, with the result that the main oil pressure source runs out and at the same time the pilot oil pressure source also runs out, thus making it no longer possible to control the control valve 5.

SUMMARY OF THE INVENTION

It is an object of the present invention to provide a control system in a hydraulic working machine wherein unnecessary power loss does not occur in an off-load state.

The control system in a hydraulic working machine according to the present invention is provided with a first prime mover, a hydraulic pump driven by the first prime mover, an actuator operated by a hydraulic oil fed from the hydraulic pump, and a control valve for controlling the operation of the actuator. Preferably, the control system is further provided with a second prime mover which is an electric motor, a pilot pump driven by the second prime mover, a pilot oil pipe extending from the pilot pump to a pilot port of the control valve, and a remote control valve mounted in the pilot oil pipe. The state of operation of the control valve is changed over by the remote control valve.

In an on-load state of the control system, a command value to a current control means for controlling the second prime mover is set to a target current value corresponding to the normal pressure, while in an off-load state it is set to a lower target current value.

In the present invention, when the first prime mover is rotating at high speed and the actuator is not operated, the pilot pump is driven independently of the first prime mover. Therefore, a large amount hydraulic oil fed from the pilot pump is not returned wastefully to the tank, that is, a large power loss does not occur. Besides, even upon turning OFF of the prime mover, the operation of the pilot pump does not stop. Thus, even if the main oil pressure source runs out, the pilot oil pressure source can be retained and hence it is possible to control the control valve and carry out a predetermined work.

In the present invention, the power loss can be minimized by controlling the electric current in the prime mover according to operating conditions.

Further, the current command value to the current control means may be held for a certain period of time even after tuning OFF of the ignition switch. In this case, even when the first prime mover is turned OFF, the operation of the pilot pump does not stop at the same time, and it is possible to control the control valve.

The command value to the current control means may be set almost equal to zero when the getting-on/off cut-off switch is OFF. By so doing, the power loss can be made smaller.

DESCRIPTION OF THE PREFERRED EMBODIMENTS

Figure 1:
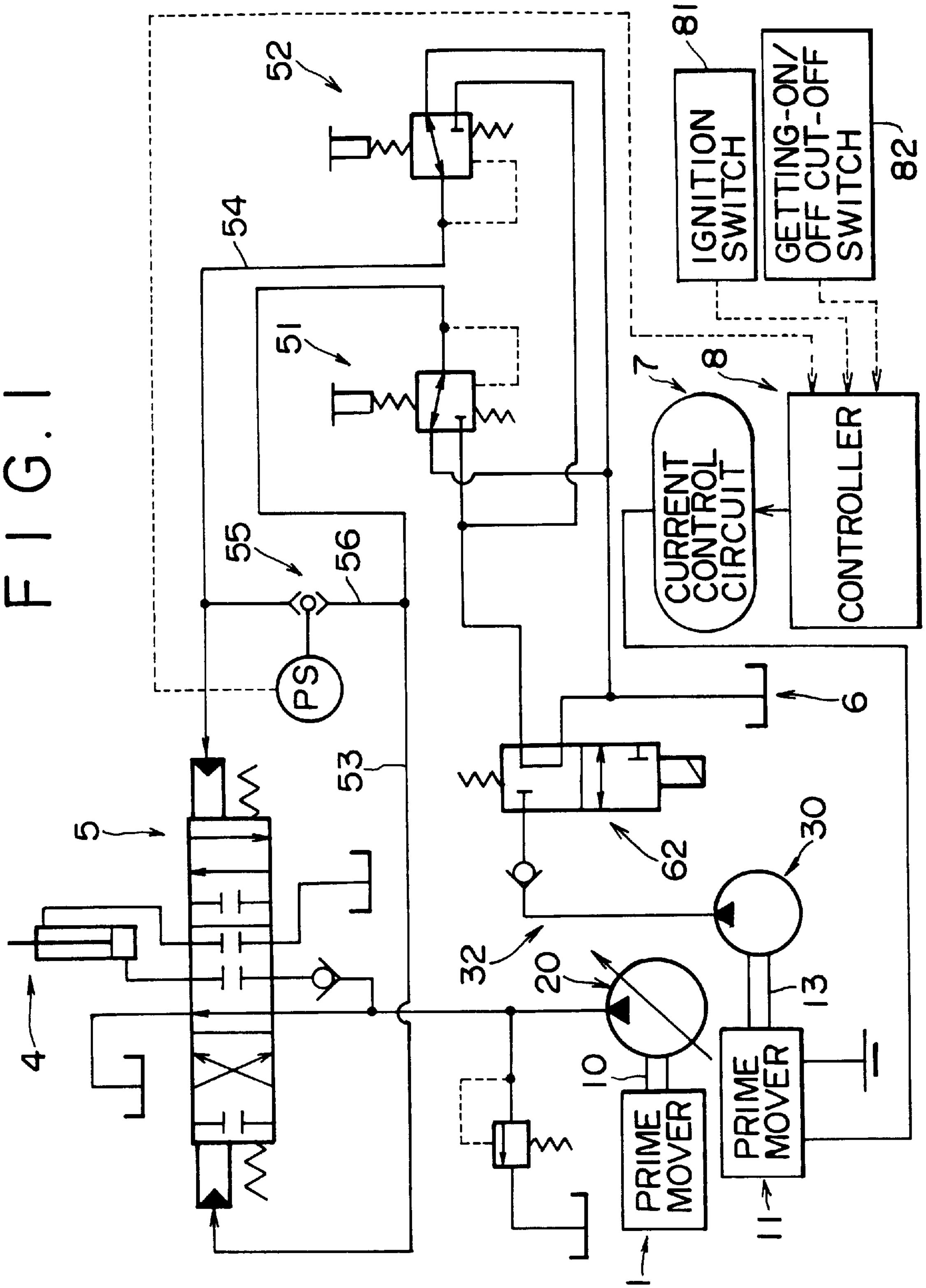
FIG. 1 is a circuit diagram showing an embodiment of the present invention.

In FIG. 1, a hydraulic pump 20 is connected to a shaft 10 of a first prime mover (internal combustion engine) 1, and an actuator 4 is connected to the hydraulic pump 20 through a control valve 5. To a pilot port of the control valve 5 are connected pilot oil pipes 53 and 54 provided with remote control valves 51 and 52, respectively. The operating condition of the control valve 5 is changed over by operating the remote control valves 51 and 52 with use of an actuator operating lever (not shown). A pipe 56 is provided for connection between the pilot oil pipes 53 and 54. In the pipe 56 is provided an operation detecting switch 55 having a shuttle valve and a pressure switch.

Separately from the first prime mover 1 there also is provided a second prime mover (electric motor) 11 used exclusively for a pilot oil pressure source. A pilot pump 30 is connected to a shaft 13 of the second prime mover 11. A discharge oil pipe 32 extending from the pilot pump 30 is connected to the remote control valves 51 and 52 and is also connected to a tank 6 through an off-load valve 62. To the second prime mover 11 is connected a controller 8 through a current control circuit 7. The number of revolutions of the second prime mover 11 is controlled by the current control circuit 7 in accordance with a current command issued from the controller 8. An ignition switch 81 and a getting-on/off cut-off switch 82 are mounted on a machine operating panel and signals provided from both switches are inputted to the controller 8. The getting-on/off cut-off switch 82 is turned on and off by operation of a getting-on/off cut-off safety lever. A signal provided from the operation detecting switch 55, which detects whether the actuator 4 is operated or not, is also inputted to the controller 8.

For operating the control system, first the ignition switch 81 is turned ON to drive the first prime mover 1, thereby operating the hydraulic pump 20. At the same time, the getting-on/off cut-off lever is turned ON to change over the off-load valve 62 from its illustrated state to a state in which the flow path from the pilot pump 30 to the tank 6 is shut off.

Figure 2:
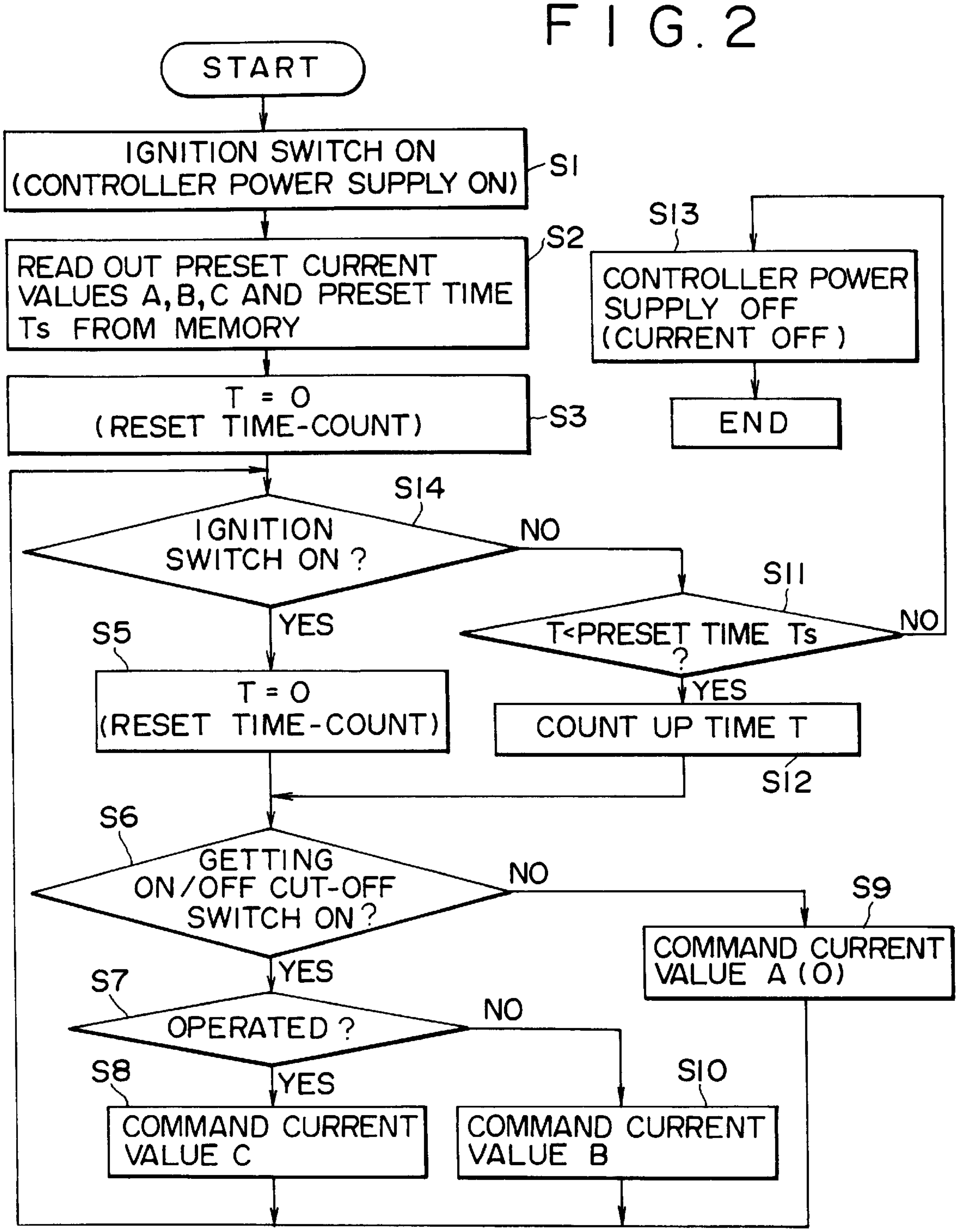
FIG. 2 is a flow chart showing a method for controlling a control valve.
Figure 3:
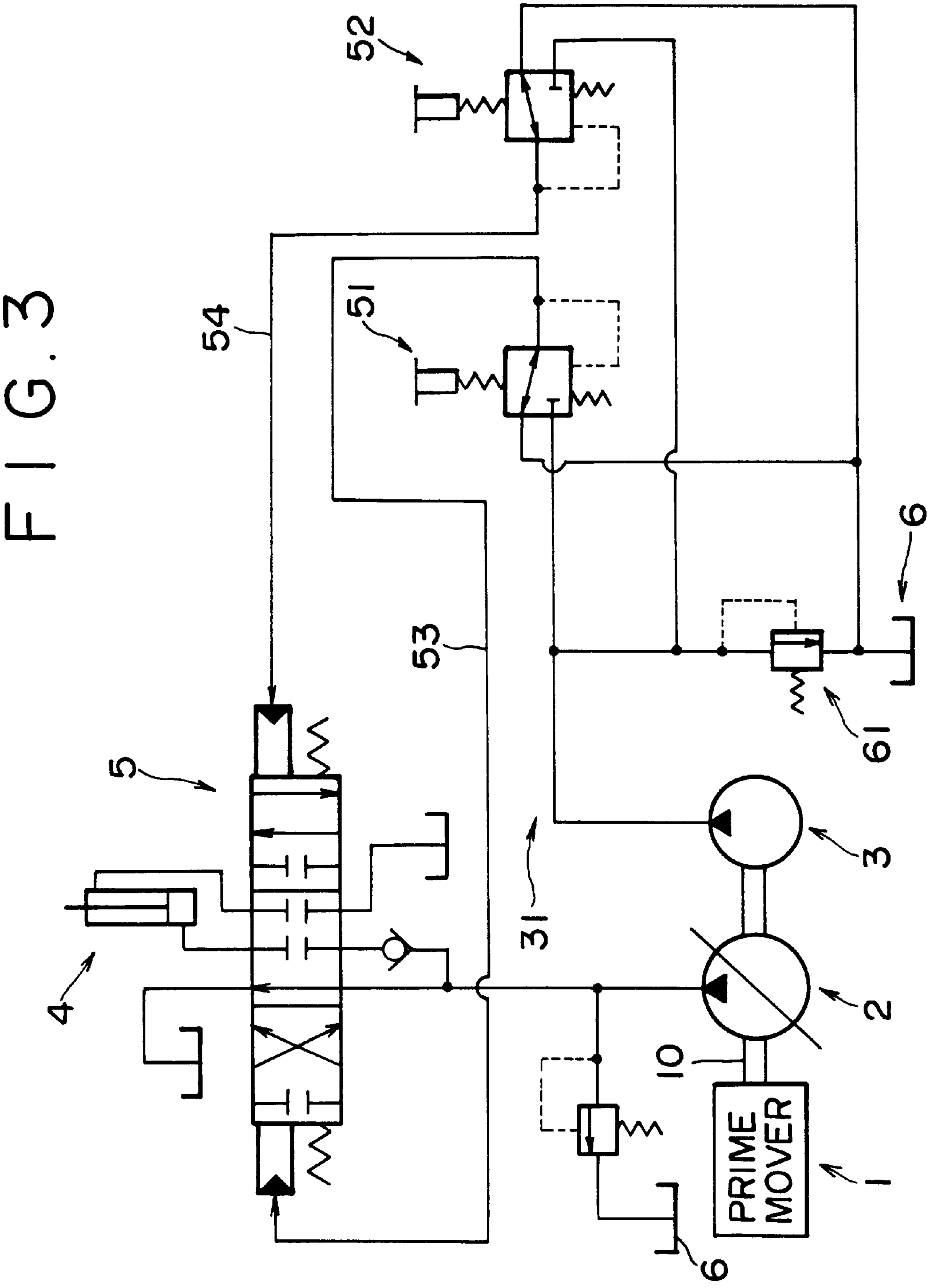
FIG. 3 is a conventional circuit diagram.

The control valve 5 is controlled in such a manner as shown in the flow chart of FIG. 2. First, in step S1, the ignition switch 81 is turned ON to apply power to the controller 8. Then, in step S2, current values A, B, C and preset time Ts, which are stored in a memory in the controller 8 and which will be described later, are read out. In step S3, a time count T is reset to 0. Then, in step S4, it is judged whether the ignition switch 81 ON or not. If it is ON, the time count T is reset to 0 in step S5, and judgment is made in step S6 as to whether the getting-on/off cut-off switch 82 is ON or not.

If it is judged in step S6 that the switch 82 is ON, judgment is made in step S7 as to whether the remote control valves 51 and 52 were operated by the operating lever. If the answer is affirmative, pilot oil is allowed to flow through the pilot oil pipes 53 and 54 and a signal indicative of the operation detected is fed to the controller 8 from the operation detecting means 55, whereby it is judged in step S7 that the remote control valves 51 and 52 were operated. Then, in step S8, the current value C, which is a predetermined value, is commanded from the controller 8 to the current control circuit 7. The number of revolutions of the second prime mover 11 is set in accordance with the current value thus commanded. Thereafter, the operation flow returns to step S4.

If it is judged in step S6 that the getting-on/off cut-off switch 82 is OFF, the current value A, which is commanded from the controller 8 to the current control circuit 7, is set to 0 or a small value close thereto to decrease the number of revolutions of the second motor 11. If it is judged in step S7 that the remote control valves 51 and 52 have not been operated by the operating lever, that is, if there is no flow of pilot oil through the pilot oil pipes 53 and 54, a signal indicative of this condition is fed from the operation detecting means 55 to the controller 8. The controller 8 commands the current value B, which is a predetermined small value, to the current control circuit 7. The current value B is larger than the current value A.

If it is judged in step S4 that the ignition switch 81 is OFF, judgment is made in step S11 as to whether the time T has elapsed over the preset time Ts (say 5 seconds) or not. If the answer is negative ($T<Ts$), counting of time is performed in step S12 and the operation flow passes from step S6 up to step S10 and returns to step S4. Then, while the operations from step S11 to step S12 are repeated, if time T exceeds the preset time Ts in step S11, the power supply of the controller 8 is turned OFF in step S13, whereby a series of control operations are ended.

If it is judged in step S6 that the getting-on/off cut-off switch 82 is OFF, the getting-on/off cut-off lever is OFF in many cases because of a considerable time period of operation stop, for example, by reason that the operator in the operator's cap leaves the seat. For energy saving, therefore, the current value for the second prime mover 11 is dropped to the small value A. The state in which the actuator is judged to be unoperated in step S7 is the state in which the operator performs no operation even with the getting-on/off cut-off lever turned ON. In this case, it suffices for the second prime mover 11 to be driven with a minimum current necessary for starting the operation smoothly. Therefore, the second prime mover 11 is operated with the current value B which is smaller than the current value C used in the operating condition.

If it is judged in step S4 that the ignition switch 81 is OFF, that is, if the ignition switch 81 is turned OFF for terminating the operation of the system, the operation of the first prime mover 1 is stopped. Even in this case, the pilot pressure is ensured subsequently for a certain time. Therefore, even when the ignition switch 81 is OFF, the actuator 4 can be driven by operation of the getting-on/off cut-off lever. For example, it becomes possible to move such a portion as can be operated with an external force (gravity) like that in lowering the boom of a hydraulic excavator. It also becomes possible to effect an urgent operation or remove the pressure remaining in the actuator 4.

From the standpoint of safety, however, it is not desirable for the pilot pressure to remain over a long time after turning OFF of the ignition switch 81. It is desirable that the time in question be set to a relatively short time. If the pressure source is to be ensured continuously with the prime mover 1 OFF, this can be done by turning ON the ignition switch 81 again.

Since in this embodiment the second prime mover 1 is provided separately from the first prime mover 1 to ensure the pilot oil pressure, the control valve 5 can be controlled with the minimum pressure oil irrespective of the operating condition of the first prime mover 1. Moreover, if the primary pressure for controlling the control valve 5 is ensured by controlling the electric current flowing in the first prime mover 1, it becomes possible to omit an off-load passage and a relief valve both required so far and hence the power loss can be kept to a minimum.

I claim:

1. A control system in a hydraulic construction machine, comprising:

- a first prime mover;
- a hydraulic pump which is driven by said first prime mover;
- an actuator which is operated by a pressure oil fed from said hydraulic pump;
- a control valve having a pilot port, said control valve controlling the operation of said actuator;
- a second prime mover which is an electric motor;
- a pilot pump which is driven by said second prime mover;
- a remote control valve disposed between said pilot pump and the pilot port of said control valve, said remote control valve controlling said control valve;
- a current control means for controlling said second prime mover; and
- a controller which, in an on-load state of the system, commands a target current value corresponding to a normal pressure to said current control means and which, in an off-load state of the system, commands a low target current value to the current control means.

2. A control system in a hydraulic construction machine according to claim 1, wherein said controller retains the current value commanded to said current control means for a predetermined certain time even after turning OFF of an ignition switch.

3. A control system in a hydraulic construction machine according to claim 1, wherein said controller sets the command value to said current control means at a value of almost zero when a getting-on/off cut-off switch is OFF.

* * * * *